US009731551B2

(12) United States Patent
Harasym

(10) Patent No.: US 9,731,551 B2
(45) Date of Patent: Aug. 15, 2017

(54) FABRICATED DROP AXLE AND METHOD OF MANUFACTURING SAME

(71) Applicant: MTH MANUFACTURING INC., Elmvale (CA)

(72) Inventor: Michael Anthony Harasym, Barrie (CA)

(73) Assignee: MTH Manufacturing Inc., Elmvale (CA)

( * ) Notice: Subject to any disclaimer, the term of this patent is extended or adjusted under 35 U.S.C. 154(b) by 0 days.

(21) Appl. No.: 14/862,458

(22) Filed: Sep. 23, 2015

(65) Prior Publication Data

US 2016/0009134 A1    Jan. 14, 2016

Related U.S. Application Data

(63) Continuation of application No. PCT/CA2014/050226, filed on Mar. 12, 2014.

(60) Provisional application No. 61/809,009, filed on Apr. 5, 2013.

(30) Foreign Application Priority Data

Jul. 25, 2013   (CA) ..................................... 2822064

(51) Int. Cl.
  *B60B 35/00*   (2006.01)
  *B60B 35/04*   (2006.01)
  *B60B 35/14*   (2006.01)
  *B60B 35/02*   (2006.01)

(52) U.S. Cl.
  CPC ............ *B60B 35/006* (2013.01); *B60B 35/02* (2013.01); *B60B 35/04* (2013.01); *B60B 35/14* (2013.01); *B60B 2310/302* (2013.01); *B60B 2310/312* (2013.01)

(58) Field of Classification Search
  CPC ... B60B 35/006; B60B 35/007; B60B 35/008; B60B 35/02; B60B 35/04; B60B 35/08; B60B 35/14; B60B 35/16
  See application file for complete search history.

(56) References Cited

U.S. PATENT DOCUMENTS

| 386,460 | A | * | 7/1888 | Gissinger | ................ | B60B 35/04 |
| | | | | | | 295/39 |
| 1,903,088 | A | * | 3/1933 | Blackmore | ............. | B60B 35/16 |
| | | | | | | 219/67 |
| 6,926,371 | B1 | * | 8/2005 | Gagnon | ................... | B60B 35/04 |
| | | | | | | 301/124.1 |
| 6,966,612 | B2 | | 11/2005 | Philpott | | |
| 7,878,516 | B2 | | 2/2011 | Gottschalk et al. | | |

(Continued)

FOREIGN PATENT DOCUMENTS

| DE | 19920670 | 11/2000 |
| EP | 2500184 | 11/2012 |

OTHER PUBLICATIONS

Written Opinion of the International Searching Authority for PCT/CA2014/050226, Canadian Intellectual Property Office, May 28, 2014.

(Continued)

*Primary Examiner* — Kip T Kotter
(74) *Attorney, Agent, or Firm* — Bhole IP Law; Anil Bhole

(57) ABSTRACT

A fabricated drop axle is described. A pair of axle stub ends is oppositely retained within a saddle having a recess through which accessories can pass.

2 Claims, 10 Drawing Sheets

(56) References Cited

U.S. PATENT DOCUMENTS 8,246,096 B2 * 8/2012 Blasingame .............. B61F 3/08
            180/250
2006/0197372 A1 9/2006 Copeland et al.

OTHER PUBLICATIONS

International Search Report for PCT/CA2014/050226, Canadian Intellectual Property Office, May 28, 2014.

* cited by examiner

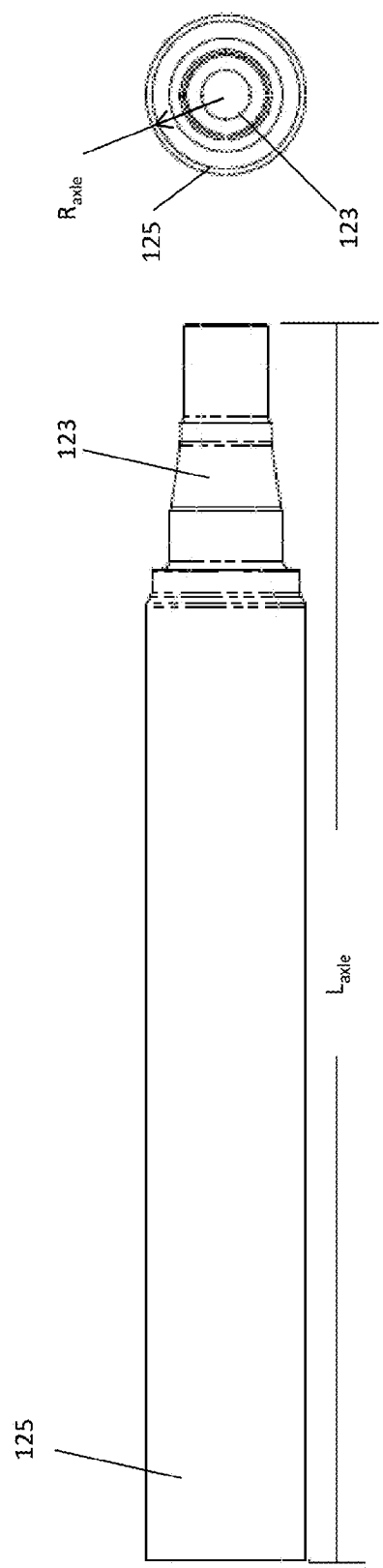

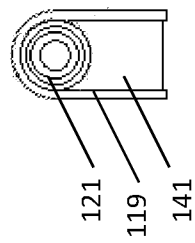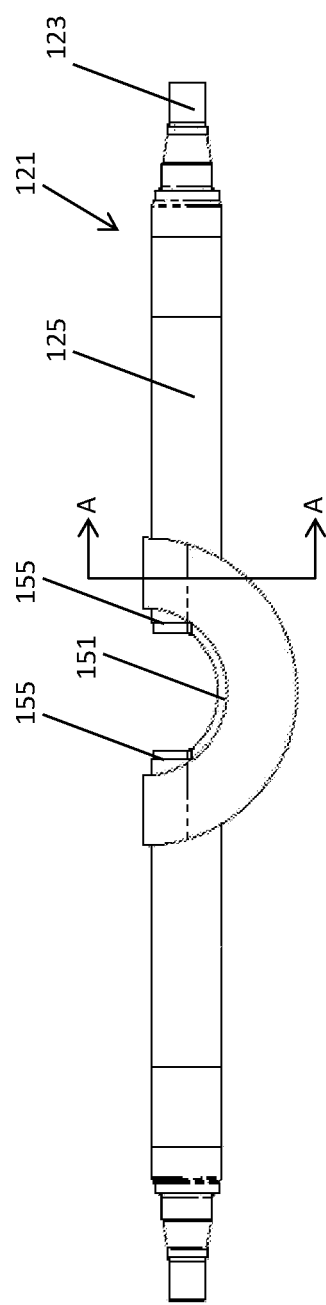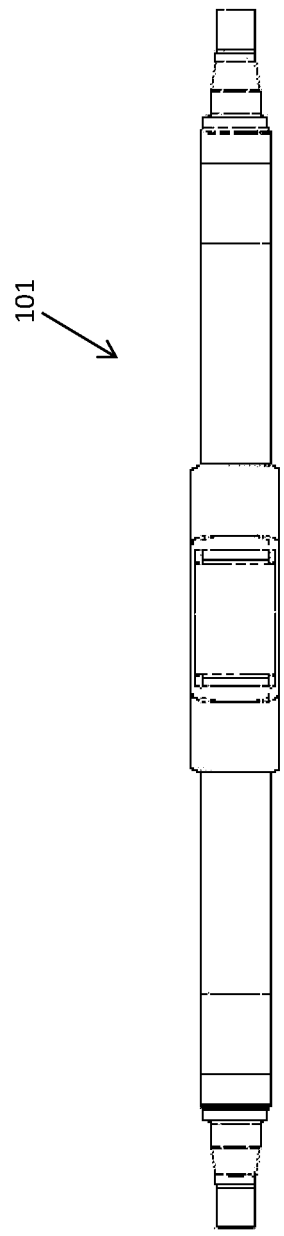
Fig. 5B
Fig. 5A
Fig. 5C

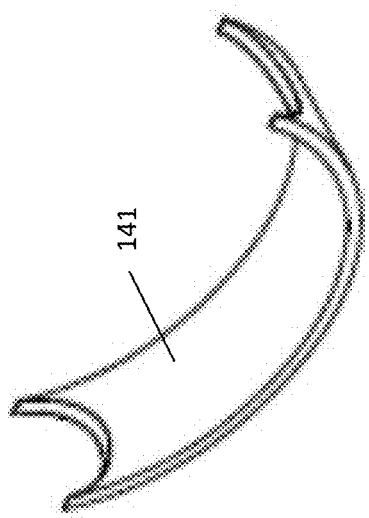
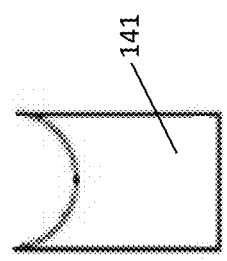
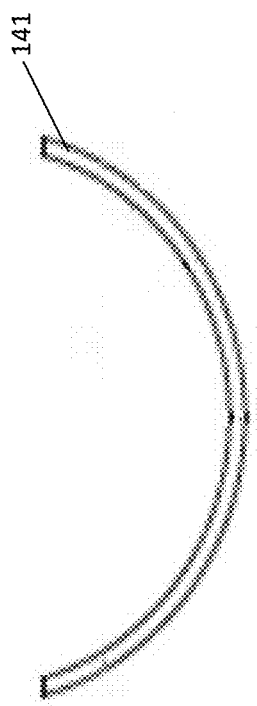

Section A-A

FABRICATED DROP AXLE AND METHOD OF MANUFACTURING SAME

TECHNICAL FIELD

The following relates generally to a drop axle for a vehicle and more specifically to a fabricated drop axle for a commercial vehicle and a method of manufacturing a fabricated drop axle for a commercial vehicle.

BACKGROUND

There exist several drop axles in the commercial vehicle freight industry. Drop axles support wheels at either end and provide clearance between the wheels for various components, such as drive shafts and discharge tubes on commercial vehicles.

Previous drop axle assemblies typically comprised formed tubes and a pair of spindles for holding wheels. The spindles were mounted to opposite ends of the tube, and the tube had formed therebetween a generally U-shaped indent to provide clearance for various components. It is desired that the spindles are coaxially aligned with each other; however, such formed-tube drop axles frequently result in misalignment between the spindles. Spindle misalignment causes accelerated tire wear and increased stresses at the intersections between axles and vehicle suspensions. One solution is to correct any misalignment by straightening the ends of the tubes after initial forming. This increases the cost to manufacture the tubes.

In an attempt to mitigate some of the disadvantages of formed-tube drop axles, manufacturers hot-form the tubes. Hot-formed tubes, however, require post-forming quenching and tempering to restore mechanical properties lost during hot-forming. The post-forming heat treatment further requires shot-blasting to remove scale, a by-product of heat treatment.

A further disadvantage to formed tubes is that forming the tubes necessarily results in thinning of the walls of the tube in high-stress regions, resulting in stress risers. Manufactures attempt to mitigate these stress risers by using thicker, heavier tubes, thereby increasing the weight and cost of their drop axles. In the commercial freight industry, increasing the weight of truck components adversely impacts fuel economy and profits.

Before forming, tubes have generally circular cross-sections. During forming, the circular cross-section is forced into an oval shape. This is often unavoidable as the material needs to stretch on the outside radii, and compress on the inside radii in order to form to the U-shaped indent. The tension on the outer radius of the tube and compression on the inner radius cause the top and bottom to be pulled together, distorting the circular cross section into an oval shape. In typical applications it is required that brackets be welded to the axle in various locations. When a bracket needs to be welded near a distorted area of the tube, custom fitting is often required to fit a bracket to a non-uniform region, adding cost to assembly.

SUMMARY

In one aspect, a saddle for a fabricated drop axle is provided. The saddle is arcuately formed about an axis to coaxially retain therein a pair of spaced apart and opposed axle stub ends, and defining a recess that substantially bisects the axis.

In another aspect, a fabricated drop axle is provided. The fabricated drop axle comprises: (a) a pair of opposed and spaced apart axle stub ends, each having a saddle end and a spindle end; and (b) a saddle arcuately formed about an axis to coaxially retain therein the saddle ends of the respective axle stub ends, and defining a recess that substantially bisects the axis.

In a further aspect, a method of manufacturing a saddle plate for a fabricated drop axle is provided. The method comprises: (a) forming a saddle plate by removing a substantially central portion of a blank to define an aperture; and (b) pressing the saddle plate substantially across the aperture about an axis over an arcuate die having a radius corresponding to a radius of an axle to be received in the saddle to transform the saddle plate into a saddle and the aperture into a recess bisecting the axis.

In a still further aspect, a method of manufacturing a fabricated drop axle is provided. The method comprises: (a) forming a saddle plate by removing a substantially central portion of a blank to define an aperture; (b) pressing the saddle plate substantially across the aperture about an axis over an arcuate die having a radius corresponding to a radius of an axle to be received in the saddle to transform the saddle plate into a saddle and the aperture into a recess bisecting the axis; (c) wherein pressing the saddle plate transforms the saddle plate into a saddle and the aperture into a recess bisecting the axis; (d) placing coaxially, opposed and spaced apart in a jig a pair of axle stub ends, each having a saddle end and a spindle end, the saddle ends each facing each other; (e) coaxially aligning the saddle with the saddle ends, the recess substantially overlapping the space between the saddle ends; and (f) mating the saddle to the axle stub ends.

BRIEF DESCRIPTION OF THE DRAWINGS

The features of the invention will become more apparent in the following detailed description in which reference is made to the appended drawings wherein:

FIG. 4A is a front view of an embodiment of an axle stub end used in the fabricated drop axle;

FIG. 4B is a side view of an embodiment of the spindle used in the fabricated drop axle;

FIG. 5A is a front view of the fabricated drop axle;

FIG. 5B is a side view of the fabricated drop axle;

FIG. 5C is a top view of the fabricated drop axle;

FIG. 6A is a top view of a bottom plate used in the fabricated drop axle;

FIG. 6B is a top left perspective view of the bottom plate used in the fabricated drop axle;

FIG. 6C is a front view of the bottom plate used in the fabricated drop axle;

FIG. 6D is a side view of the bottom plate used in the fabricated drop axle;

DETAILED DESCRIPTION

Figure 1:
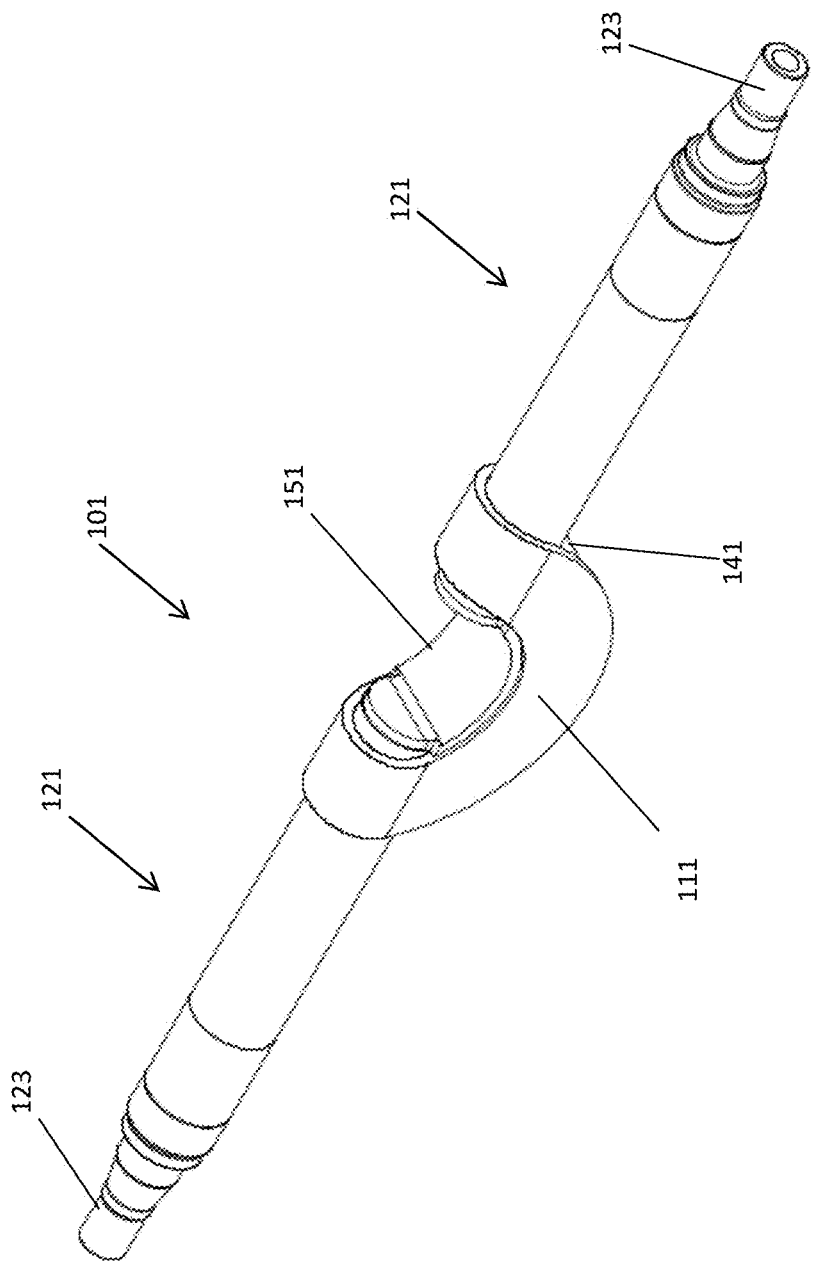
FIG. 1 is a front left perspective view of an embodiment of a fabricated drop axle.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

A fabricated axle assembly comprises two symmetrical straight cylindrical tubes each having a spindle on an end. The two cylindrical tubes are joined in the centre by a fabricated "drop" section, or saddle. The saddle is provided with a recess to allow for the passage of ancillary vehicle equipment such as a drive shaft on a tractor trailer or straight truck or a centre discharge tube on a semi-trailer or tanker. The fabricated axle assembly further comprises a pair of support braces to strengthen joints between the saddle and the cylindrical tubes. The support braces serve to increase the surface area for welding the saddle to the cylindrical tube, thereby providing stronger joints. A bottom plate spans the distance between the axle stub ends along the saddle. A top plate is disposed between the axle stub ends and substantially corresponds to the aperture. The bottom and top plates are provided to strengthen the saddle and to provide for longer weld joints.

Referring now to FIG. 1, an embodiment of the fabricated drop axle 101 is shown. The fabricated drop axle 101 comprises a pair of opposed axle stub ends 121, a saddle 111, and a top plate 151. The fabricated drop axle further comprises a pair of support braces 131 shown in FIGS. 8A to 8D, and a bottom plate 141 shown in FIGS. 6A to 6D.

As best shown in FIGS. 4A to 4B, each axle stub end 121 comprises a rigid, cylindrical tube 125 having a radius $R_{axle}$ and an axial length $L_{axle}$. The axle stub end 121 has a spindle end having a spindle 123 for rotatably mounting thereto a wheel. The axle stub end 121 further has a saddle end for attaching to the saddle as described herein. It will be appreciated that the dimensions of the spindle 123 may vary depending on the application, but these are typically determined by the type and size of a hub of the wheel to be mounted thereto. The length $L_{axle}$ of the axle stub end 121 is dictated by the desired track-length between wheels, and can vary from one application to another. The radius $R_{axle}$ is dependent on the desired load rating for the fabricated drop axle 101, and the design of a suspension axle seat. Similarly, the thickness of the cylindrical tube 125 typically ranges from 0.500" to 0.750", depending upon the desired gross axle weight rating of the fabricated drop axle 101; however, the present specification is not to be limited in this regard.

As can be best seen in FIGS. 3A to 3D, the saddle 111 will be described in greater detail. In embodiments, the saddle 111 has a pair of flat, substantially parallel flanges 119. Each flange 119 has an inner surface and an outer surface and is generally U-shaped, defining a central recess 115 having a radius $R_{recess}$. The inner surface of the first flange is substantially parallel and spaced apart from the inner surface of the second flange by a distance substantially equal to the diameter of each axle stub end 121. The first and second flanges are joined at either side of their respective recesses 115 (at the tops of their respective U-branches) by two saddle segments 117. Saddle segments 117 are arcuately formed about an axis parallel to, and equidistant from, the flanges 119. Saddle segments 117 have a radius $R_{saddle}$ substantially equal to the radius of each axle stub end 121. Each saddle segment 117 is thereby configured to receive and partially encircle an axle stub end 121. The recess 115 substantially bisects the axis about which saddle segments 117 are arcuately formed. It will be appreciated that the saddle may be monolithically formed as hereinafter described in greater detail, or fabricated by suitably mating the saddle segments 117 to the flanges 119.

In typical applications, the inner saddle radius $R_{saddle}$ is approximately 2.5" to accommodate an axle stub end 121, which typically has an outer radius $R_{axle}$ of approximately 2.5". In embodiments, saddle 111 is mated to each of the axle stub ends 121 by welding the adjacent portion of the saddle segment 117 with each of the axle stub ends 121.

Support braces 131 enhance the strength of the assembly, as hereinafter described in greater detail. It will be appreciated, however, that the axle stub ends 121 can be mated to the saddle 111 using any suitable method, including fasteners, clamps and adhesives.

In preferred embodiments, the fabricated drop axle assembly 101 further comprises at least one of a top plate 151, a bottom plate 141 and support braces 131. It will be appreciated that the top plate 151, bottom plate 141 and support braces 131 strengthen the fabricated drop axle assembly in embodiments where the axle stub ends 121 are welded to the saddle 111. Welded joints commonly fail towards their starts or ends. With the support braces in place, a continuous weld circumscribes the axle stub end 121 along the portion between the axle stub end 121 and the support brace 131 that continues from the intersection between the axle stub end 121 and the saddle segment 117. It will be appreciated that the continuous weld thereby eliminates weld starts and ends. In embodiments, the top plate 151, bottom plate 141 and support braces 131 may not be required, provided that other suitable techniques to join the saddle 111 to the axle stub ends 121 are provided. For instance, fasteners may be used to join the saddle 111 to the axle stub ends.

A more detailed description of the top plate 151 will now be provided with reference to FIGS. 1 and 7A to 7D. In embodiments, the fabricated drop axle comprises a top plate 151. Top plate 151 comprises a pair of opposed and parallel tab plates 155 each respectively extending from either edge of an axially extending arcuate plate 153. The distance between the inner surfaces of the tab plates 155 is defined by the inner chord length of the arcuate plate 153. Arcuate plate 153 has an outer radius $R_{top}$ substantially identical to the radius $R_{recess}$ of the recesss 115 and an axial dimension substantially identical to the diameter of the axle stub end 121 and the distance between the inner surfaces of the opposed flanges 119. The respective outer surfaces of the tab plates 153 are parallel and spaced apart a distance substantially equal to the distance between the respective saddle ends of each of the axle stub ends 121. The top plate 151 is mated to the saddle 111 by welds along the intersection between the saddle 111 and the top plate 151. The entire fabricated drop axle assembly 101 may be further strengthened by welding the tab segments 155 to the saddle ends of the axle stub ends 121. It will be appreciated that the shape and dimensions of the top plate 151 may be correspondingly adjusted with respect to deviations in the design of the saddle 111.

In embodiments, the fabricated drop axle preferably comprises a pair of support braces 131, as best viewed in FIGS. 8A to 8D, and FIG. 9. Each support brace 131 is an arcuate, axially extending plate. The inner radius $R_{support}$ of the support brace 131 is substantially identical to the radius $R_{axle}$ of the axle stub end 121. The support brace 131 has an outer chord distance substantially equal to the diameter of the axle stub end 121. It will be appreciated that this chord is further substantially identical to the distance between the inner surfaces of the respective parallel flanges 119. The axial length of the support brace 131 is preferably less than the distance between the edge of the flange 119 and the recess 115 such that the axial edges of support brace 131 are entirely in contact with the flanges 119. In embodiments, each support brace is welded along its edges adjacent to the axle stub ends 121 and flanges 119.

In preferred embodiments, the fabricated drop axle further comprises a bottom plate 141 as shown in FIGS. 6A to 6D. The bottom plate 141 is arcuate and has an outer radius $R_{bottom}$ approximately equal to the outer radius $R_{flange}$ of the flange 119. The bottom plate 141 axially extends a distance substantially equal to the distance between the inner surfaces of the flanges 119. Each end of the bottom plate 141 is notched to partially abut one of the axle stub ends 121. Bottom plate 141 further strengthens the fabricated drop axle assembly in the same manner as described with reference to top plate 151. The bottom plate 141, being disposed between the flanges 119, has edges abutting the flanges 119. This defines an adjacent portion along which the bottom plate 141 may be welded to the saddle 111. Each of the ends of bottom plate 141, being notched to partially abut one of the axle stub ends 121, forms an adjacent edge with the axle stub end 121 along which a weld is applied.

In embodiments, a method is provided for manufacturing the fabricated drop axle 101.

Referring now to FIG. 4, an axle stub end 121 as heretofore described has a substantially straight length of cylindrical tube 125 having a spindle end and a saddle end. Spindle 123 can be attached to the spindle end of the cylindrical tube 125 using any suitable means. In embodiments, the spindle 123 may be welded to the spindle end of the cylindrical tube 125. In further embodiments, cylindrical tube 125 is formed to have a "near net" spindle end (i.e., the cylindrical tube 125 is initially produced to have a spindle end substantially similar to the finished spindle shape); pre-formed cylindrical tube 125 is then machined to a final shape and size substantially identical to the spindle 123. Preferably, the regions of the spindle 123 which mate to bearings of a wheel are heat treated to improve wear resistance.

The saddle end of the cylindrical tube 125 is machined "on centre" with respect to the spindle, so that the cylindrical tube 125 can be accurately located for mating with the saddle 111, as hereinafter described in greater detail.

Figure 2B:
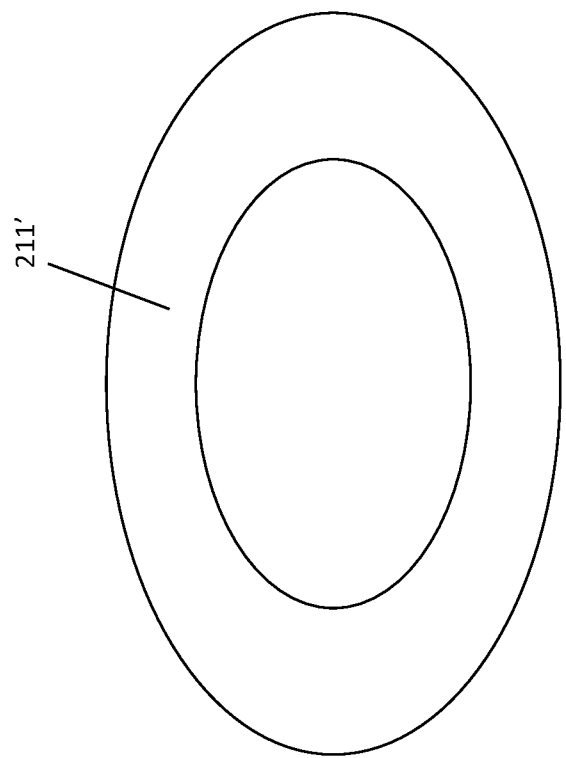
FIG. 2B is a top view of a second embodiment of a saddle plate used in the saddle of the fabricated drop axle.
Figure 2A:
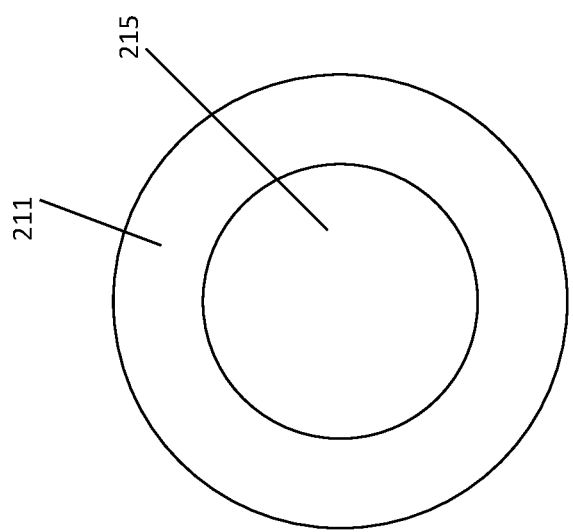
FIG. 2A is a top view of a first embodiment of a saddle plate used in a saddle of the fabricated drop axle.
Figure 3B:
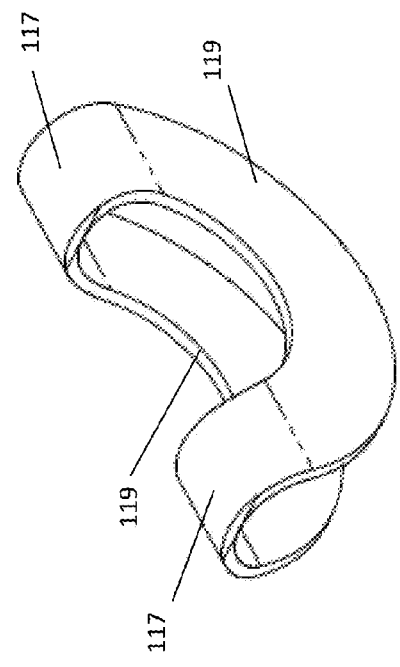
FIG. 3B is a top right perspective view of the saddle used in the fabricated drop axle.
Figure 3D:
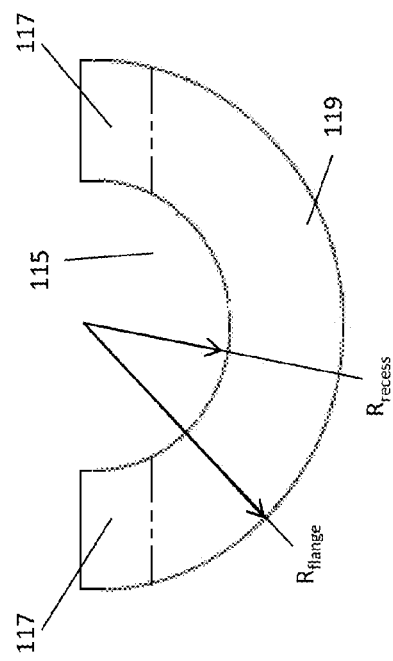
FIG. 3D is a side view of the saddle used in the fabricated drop axle.
Figure 3A:
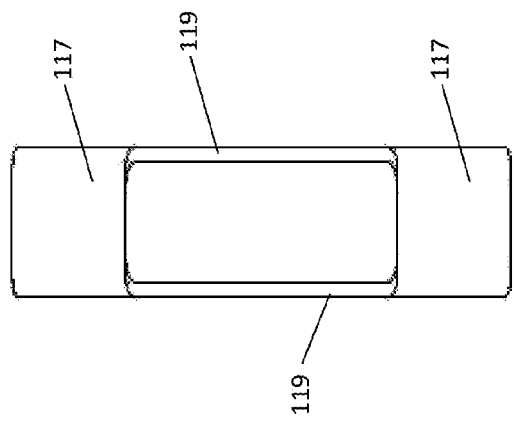
FIG. 3A is a top view of the saddle used in the fabricated drop axle.
Figure 3C:
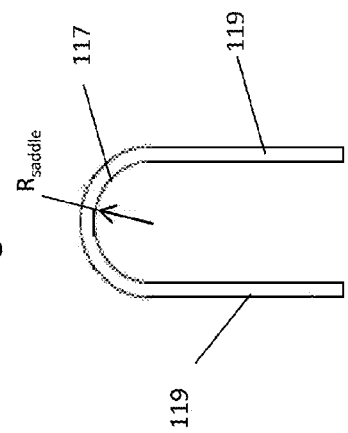
FIG. 3C is a front view of the saddle used in the fabricated drop axle.
Figure 7B:
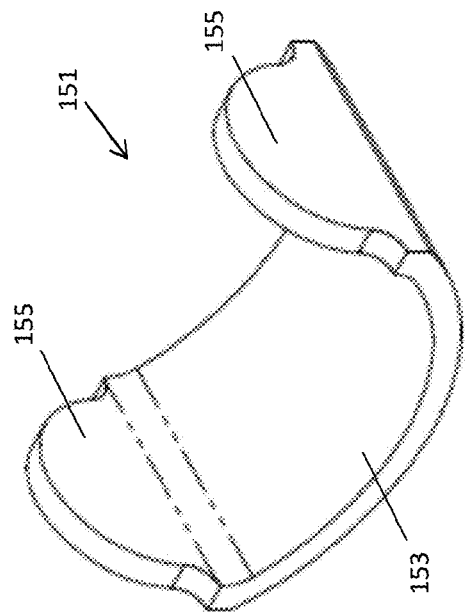
FIG. 7B is a top left perspective view of the top plate used in the fabricated drop axle.
Figure 7D:
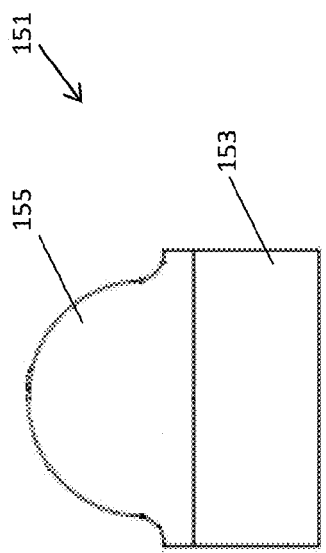
FIG. 7D is a side view of the top plate used in the fabricated drop axle.
Figure 7A:
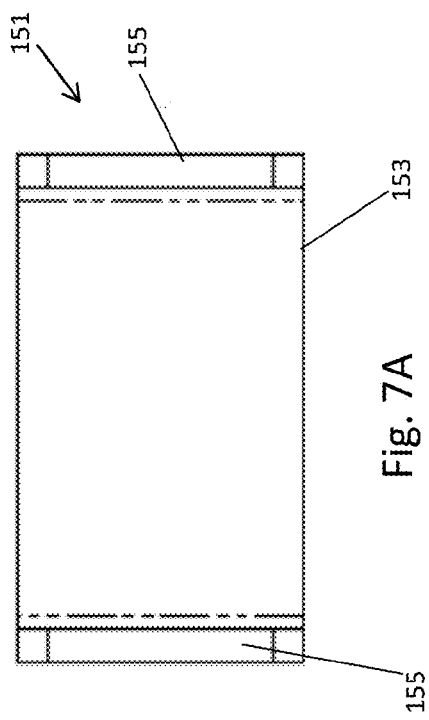
FIG. 7A is a top view of a top plate used in the fabricated drop axle.
Figure 7C:
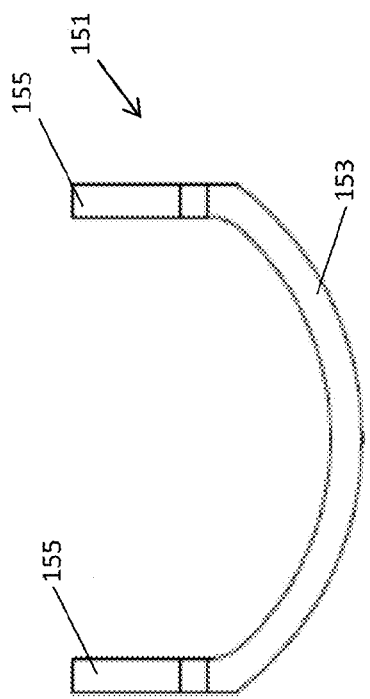
FIG. 7C is a front view of the top plate used in the fabricated drop axle.
Figure 8A:
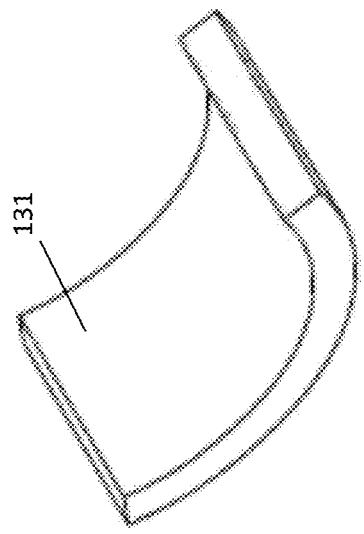
FIG. 8A is a top view of a support brace used in the fabricated drop axle.
Figure 8B:
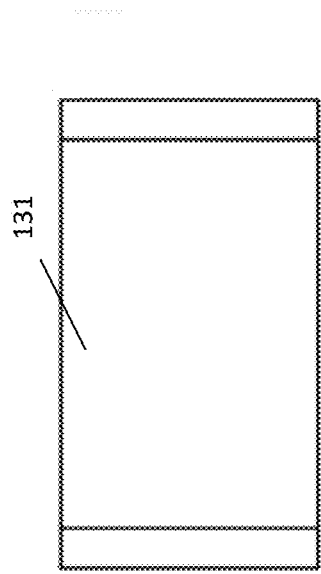
FIG. 8B is a top left perspective view of the support brace used in the fabricated drop axle.
Figure 8D:
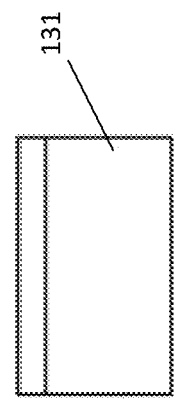
FIG. 8D is a side view of the support brace used in the fabricated drop axle.
Figure 8C:
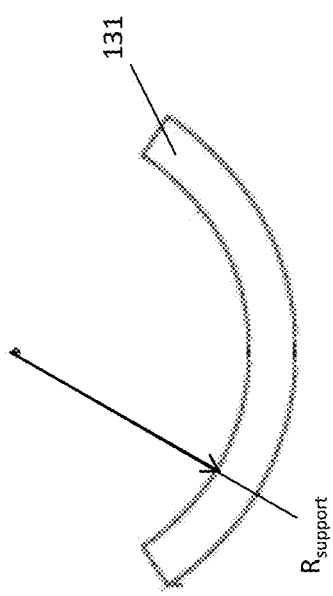
FIG. 8C is a front view of the support brace used in the fabricated drop axle.
Figure 9:
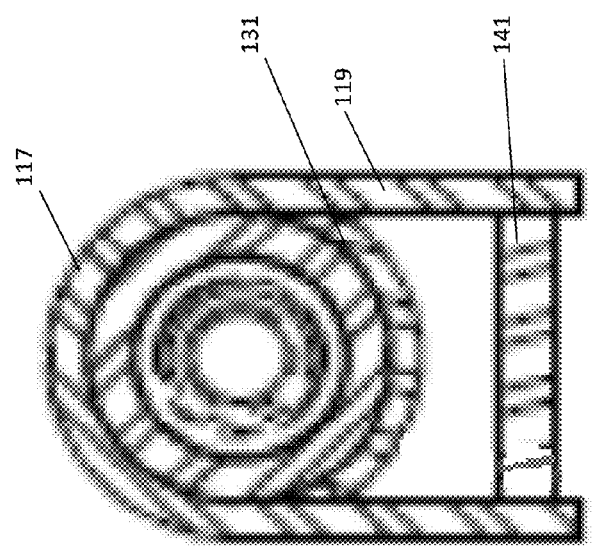
FIG. 9 is a cross sectional view of the fabricated drop axle taken along line A-A in FIG. 5A.

Having reference to FIGS. 2A, 2B, 3A to 3D, and 10, a method of manufacturing the saddle 111 is described. At block 1 in FIG. 10, a pre-form blank 211 (or 211')as shown in FIGS. 2A and 2B is created from one of various methods. In embodiments, the pre-form blank 211 has a pre-form aperture 215 cut at its centre. Cutting may be achieved by blanking or plasma cutting. At block 2 in FIG. 10, pre-form blank is formed into the saddle 111 by a suitable mechanical or hydraulic press over a die having a radius substantially similar to the desired radius $R_{saddle}$ of the finished saddle 111. After formation, the saddle plate 211 acquires the shape of saddle 111 and the aperture is bent upon itself to form the recess. In embodiments, the saddle plate 211 is fabricated from a circular plate 213 having at its centre a circular aperture 215.

As will be appreciated, the saddle plate 211 is preferably fabricated of high strength structural steel having physical and chemical properties suited to the application. The selected material is preferably suited to welding. In typical embodiments, the saddle plate 211 has a thickness in the range of ⅜" to ¾"; however, the thickness is dictated by the desired GAWR (Gross Axle Weight Rating) of the axle. It will be appreciated, however, that other axle dimensions may be accommodated by increasing or decreasing the inner saddle radius $R_{saddle}$ so that it is substantially the same as the outer radius $R_{axle}$ of the axle stub ends 121. The amount of drop required in the axle will dictate the dimensions of the saddle plate 211 and dimensions of the press dies.

In preferred embodiments, the plate 211 is substantially circular or oval, as shown in FIGS. 2A and 2B, respectively. In preferred embodiments, the aperture 215 is similarly circular or oval. It will be appreciated that rounded edges and corners are less prone to failures resulting from stress concentrations. It will be further appreciated, however, that the plate 211 and the aperture 215 may take other forms, such as squares or rectangles. In embodiments, for example, the plate is square and the aperture is circular. In other embodiments, however, the plate is square and the aperture is oval. It will be appreciated that other shape combinations may be achieved, provided that the recess formed by the recess in saddle 111 resulting from formation of the saddle plate 211 provides clearance for various commercial vehicle components.

Support braces 131, top plate 151 and bottom plate 141 are manufactured in a similar manner, with appropriate modification, as the saddle 111, as heretofore described. Each begins as a pre-form blank having a suitable shape obtained by blanking or cutting, including by plasma, laser or water jet. Each is then formed, as respectively shown in blocks 6, 9, and 12 of FIG. 10, by any suitable mechanical or hydraulic press over a die having a radius substantially identical to the inner radius of the finished piece. In embodiments for example, support braces 131 are arcuately formed over a die having a radius substantially equal to the radius of the axle stub end 121.

The manufacture of the constituent components of the fabricated drop axle 101 having been described, reference will now be made to FIGS. 1 and 5 for an understanding of a method of assembling the fabricated drop axle 101.

Figure 10:
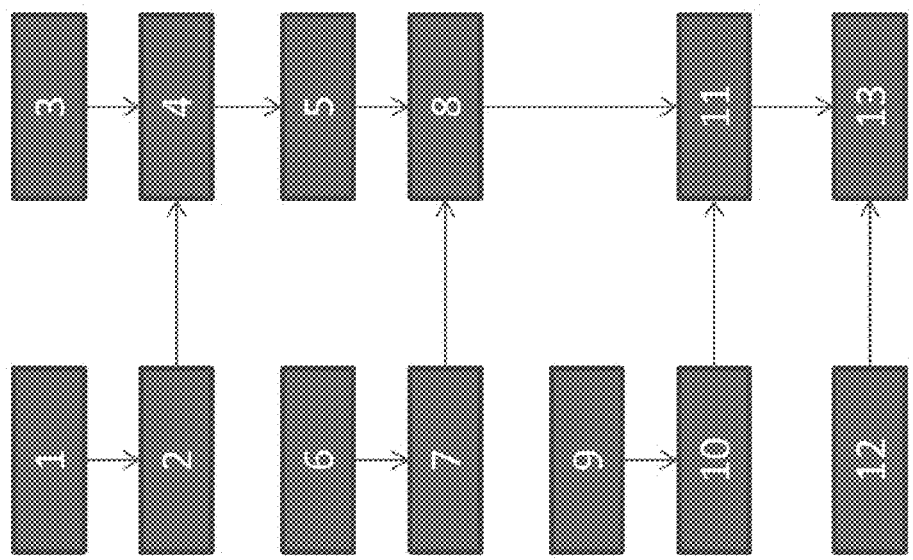
FIG. 10 is a flow chart illustrating a method of manufacturing an embodiment of the drop axle.

In a welding jig (not shown), the axle stub ends 121 are coaxially aligned opposite each other, as shown at block 3 of FIG. 10. The saddle end of each cylindrical tube 125 having been "on centre" machined with respect to the spindle 123, the axle stub ends 121 are accurately and coaxially aligned by locating features that register on each spindle 123 and on the area of each cylindrical tube that was "on centre" machined.

Once both axle stub ends 121 have been located in the welding jig, the saddle 111 is placed over the saddle ends of the axle stub ends 121, as shown at block 4 of FIG. 10, and welded along the adjacent portion, as shown at block 5 of FIG. 10.

The axle stub ends 121 and saddle 111 having been mated, the resulting assembly is pivoted in the welding jig 180 degrees about the axis of rotation of the axle stub ends 121, so that the flanges 119 project away from the base of the welding jig. Each support brace 131 is then located between the flanges 119 so that the inner arcuate surface of the support brace 131 interfaces with a portion of the saddle end of the axle stub end 121, as shown at block 7 of FIG. 10. Each support brace 131 is then welded to each respective axle stub end 121 and the saddle 111 along the edges of the support brace 131 respectively adjacent to each axle stub end 121 and the saddle 111, as shown at block 8 of FIG. 10.

In embodiments, the bottom plate 141 is aligned between the inner surfaces of the flanges 119 so that the outer radius of the bottom plate 141 is substantially aligned with the radius $R_{saddle}$ of the saddle 111. The bottom plate 141 is then welded to the saddle 111, preferably along the full length of the intersection of the bottom plate 141 and the saddle 111, as shown at block 13 of FIG. 10.

The resulting assembly is again rotated in the welding jig by 180 degrees about the axis of rotation of the axle stub ends 121 so that the flanges 119 project toward the welding jig and the saddle sections 117 projects away from the welding jig. The top plate 151 is then introduced between the axle stub ends 121 so that the arcuate plate 153 is substantially coaxial with the aperture 115 of the saddle 111, and so that the substantially semi-circular tab ends are substantially coaxial with the axle stub ends 121, as shown at block 10 of FIG. 10. The top plate 151 is then welded to the assembly along the portions adjacent therewith, as shown at block 11 of FIG. 10.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A fabricated drop axle assembly, comprising:
    a pair of opposed and spaced apart axle stub ends, each having a saddle end and a spindle end;
    a saddle arcuately formed about an axis to coaxially retain therein the saddle ends of the respective axle stub ends, and defining a recess that substantially bisects the axis;
    a top plate comprising:
        a pair of opposed tab segments, each tab segment abutting and mated to one of the saddle ends of the opposed stub ends; and
        a bridge segment joining the tab segments, having a span defined by the recess, the span having two longitudinal edges each of which abuts and mates with the saddle; and
    a bottom plate comprising first and second ends to abut and mate the saddle end of each of the axle stub ends, and further comprising a span longitudinally abutting and mating with the saddle along a bottom portion thereof spaced apart from the recess.

2. The fabricated drop axle assembly of claim 1, further comprising:
    a pair of support braces, each support brace arcuately formed about the axis and mated to the saddle and the saddle end of each spaced apart axle stub end, wherein the support brace and the saddle substantially and oppositely circumscribe the saddle end of each spaced apart axle stub end.

* * * * *